United States Patent
Varjasi et al.

(10) Patent No.: US 11,037,418 B2
(45) Date of Patent: Jun. 15, 2021

(54) DISTRIBUTED OCCUPANCY DETECTION SYSTEM AND METHOD

(71) Applicant: Current Lighting Solutions, LLC, East Cleveland, OH (US)

(72) Inventors: Tamas Varjasi, Budapest (HU); Gabor Szabo, Budaors (HU); Sandor Polyak, Budapest (HU); Balazs Bencze, Budapest (HU); Gergely Katz, Budapest (HU)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/177,476

(22) Filed: Nov. 1, 2018

(65) Prior Publication Data

US 2019/0340902 A1    Nov. 7, 2019

Related U.S. Application Data

(60) Provisional application No. 62/667,488, filed on May 5, 2018.

(51) Int. Cl.
*G08B 13/19* (2006.01)
*G01V 8/20* (2006.01)
*G01J 5/00* (2006.01)

(52) U.S. Cl.
CPC ............ *G08B 13/19* (2013.01); *G01J 5/0025* (2013.01); *G01V 8/20* (2013.01)

(58) Field of Classification Search
CPC .............. G08B 13/19; G08B 13/19641; G08B 13/19602; G01J 5/0025; G01V 8/20
See application file for complete search history.

(56) References Cited

U.S. PATENT DOCUMENTS

| 9,277,629 B2 | 3/2016 | Steiner et al. |
| 2012/0299733 A1 | 11/2012 | Knibbe et al. |

(Continued)

FOREIGN PATENT DOCUMENTS

CN    104994576 A    10/2015

OTHER PUBLICATIONS

International Search Report and Written Opinion dated Aug. 16, 2019 which was issued in connection with PCT/US2019/030449 which was filed on May 2, 2019.

*Primary Examiner* — Ryan W Sherwin
(74) *Attorney, Agent, or Firm* — Buckley, Maschoff & Talwalkar LLC (57) ABSTRACT

A distributed occupancy detection system includes plural networked node devices configured to be spatially distributed throughout a structure. Each node device includes an occupancy sensor that senses a presence characteristic indicative of an object being in a monitored area of the structure that is associated with the occupancy sensor. Each node device also includes one or more processors that determine a probability that the object is or was located in the structure based on the presence characteristic sensed by the occupancy sensor of a first node device and based on the presence characteristic sensed by the occupancy sensor of one or more neighboring node devices. The one or more processors determine whether the object is in the structure based on the probability.

17 Claims, 4 Drawing Sheets

(56) References Cited

U.S. PATENT DOCUMENTS

2014/0167969 A1\* 6/2014 Wedig ................... G08B 7/066
    340/584
2015/0130933 A1 5/2015 Breuer et al.
2016/0116343 A1 4/2016 Dixon et al.

\* cited by examiner

DISTRIBUTED OCCUPANCY DETECTION SYSTEM AND METHOD

BACKGROUND

A variety of occupancy detection systems can determine when an object is moving within an area monitored by a sensor. For example, a passive infrared sensor can detect when a person has walked into a field of view of the sensor. This can be useful to determine when a person enters a dark room (to automatically activate a light), to determine when an unauthorized person is within a room, or the like.

One problem with existing occupancy detection systems is that the systems may rely on the detection of movement by a single sensor. For example, some known detection systems automatically determine that a person is inside a room responsive to a single passive infrared sensor detecting infrared radiation emitted from that person. While the detection system may include several passive infrared sensors, the system may determine that a person is present in a room responsive to any one of the sensors detecting movement of the person.

But, relying on a single sensor to determine the presence of a person in a room results in a trade-off between accuracy of the detection and sensitivity of the detection. On one hand, the threshold level of detected infrared radiation needed to determine that a person is within a field of view of a sensor can be increased to ensure that fewer false-positive detections of the presence of the person occur. But, increasing this threshold can result in the presence of the person not being detected at one or more times. On the other hand, lowering the threshold level of infrared radiation needed to determine that the person is within the field of view of the sensor can result in fewer missed detections of the presence of the person, but also can result in too many false-positive detections of a person being present in the room when there is no person in the room.

BRIEF DESCRIPTION

In one embodiment, a first node device of a distributed occupancy detection system is provided. The node device includes an occupancy sensor configured to sense a presence characteristic indicative of an object being in a monitored area of a structure that is associated with the occupancy sensor. The node device also includes one or more processors configured to determine a probability that the object is or was located in the monitored area of the structure based on the presence characteristic sensed by the occupancy sensor. The one or more processors also are configured to receive one or more detection signals from one or more second node devices in the distributed occupancy detection system. The one or more detection signals indicate that the one or more second node devices also sensed the presence characteristic indicating that the object was or is located in one or more monitored areas of the structure that are associated with the one or more second node devices. The one or more processors are configured to change the probability that the object is or was located in the monitored area of the structure based on the one or more detection signals received from the one or more second node devices. The one or more processors also are configured to determine whether the object is in the structure based on the probability that is changed based on the one or more detection signals.

In one embodiment, a method is provided that includes sensing a presence characteristic using an occupancy sensor of a first node device in a distributed occupancy detection system. The presence characteristic is indicative of an object being in a monitored area of a structure that is associated with the occupancy sensor. The method also includes calculating a probability that the object is or was located in the monitored area of the structure based on the presence characteristic sensed by the occupancy sensor, and receiving one or more detection signals from one or more second node devices in the distributed occupancy detection system. The one or more detection signals indicate that the one or more second node devices also sensed the presence characteristic indicating that the object was or is located in one or more monitored areas of the structure that are associated with the one or more second node devices. The method also includes changing the probability that the object is or was located in the monitored area of the structure based on the one or more detection signals received from the one or more second node devices, and determining whether the object is in the structure based on the probability that is changed based on the one or more detection signals.

In one embodiment, a distributed occupancy detection system is provided that includes plural node devices configured to be spatially distributed throughout a structure and communicatively coupled with each other in a network. Each of the node devices includes an occupancy sensor that is configured to sense a presence characteristic indicative of an object being in a monitored area of the structure that is associated with the occupancy sensor. Each of the node devices also includes one or more processors configured to determine a probability that the object is or was located in the structure based on the presence characteristic sensed by the occupancy sensor of a first node device of the plural node devices and based on the presence characteristic sensed by the occupancy sensor of one or more neighboring node devices of the plural node devices that neighbor the first node device in the structure. The one or more processors are configured to determine whether the object is in the structure based on the probability.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The inventive subject matter described herein relates to distributed occupancy detection systems and methods that detect the presence of one or more objects in a structure more accurately than some known detection systems. The systems and methods determine whether a structure (e.g., a room) is occupied by one or more persons or other objects by cooperation of multiple node devices that are spatially distributed throughout the room. These node devices can be communicatively coupled with each other in a wired and/or wireless network, such as a mesh network or another type of network.

Each node device can include an occupancy sensor connected with one or more processors (e.g., a wireless communication-capable microprocessor). The occupancy sensor can use one or more techniques (e.g., infrared detection) to determine whether an object is located within a monitored area of the structure that is associated with the occupancy sensor. This monitored area can be the field of view of the occupancy sensor. The occupancy sensor can determine when an object is detected within the monitored area, and send a presence signal to the processor in the same node device that indicates detection of the object. This presence signal can indicate the magnitude of infrared radiation, motion, or the like, that is detected by the occupancy sensor. For example, larger objects and/or faster moving objects may be associated with signals indicating larger magnitudes, while smaller objects and/or slower moving objects may be associated with signals indicating smaller magnitudes.

The node devices can be communicatively coupled with each other in the network such that each node device that detects the presence of an object can communicate a probability signal indicating a likelihood that an object was detected. This probability signal can be communicated to other node devices in the structure, such as to the node devices that neighbor the detecting node device.

The sensitivity of the occupancy sensors in the node devices can be low such that very little sensed infrared radiation (or other presence characteristic that is sensed to identify the presence of an object) can indicate the potential presence of the object within the area monitored by one or more sensors. If the magnitude of the presence characteristic detected by any one of the node devices is significantly large, then the processor of that single node device can determine a large probability or likelihood that an object is within the structure and is within the monitored area associated with that single node device. For example, the magnitude of the sensed presence characteristic can be compared with an upper designated threshold of the detection system and the presence of the object can be detected responsive to the magnitude of the sensed presence characteristic exceeding the upper threshold. Conversely, the presence of the object in the structure may not be detected if the magnitude of the sensed presence characteristic does not exceed the upper threshold. The presence characteristic that is sensed can include one or more features that may indicate that the object is located within a monitored area, such as object motion, infrared radiation emitted by the object, changes in light due to the presence or movement of the object, etc.

But, not all sensed presence characteristics will have magnitudes that exceed this upper threshold. For example, the upper threshold may be set by an operator of the detection system such that only extremely large magnitudes of the sensed presence characteristic exceed the upper threshold such that there is little to no doubt of the presence of the object in the room.

For sensed presence characteristics having lesser magnitudes, however, the presence of the object may not be detected or confirmed by a single node device. Instead, the node devices communicate with each other to determine if multiple node devices (e.g., multiple neighboring node devices) detect presence characteristics indicating that an object likely is located in the room or may be located in the room. Node devices may neighbor each other when there are no other node devices located between the neighboring node devices or when the node devices are within a designated distance of each other, such as three meters or less, or five meters or less.

If multiple node devices all detect presence characteristic magnitudes indicating a likelihood that the object is in the room, then the processor of one or more of the node devices can determine a larger probability or likelihood of that the object is located within the structure and/or a location of where the object is in the structure. This probability or likelihood may increase for larger numbers of node devices detecting presence characteristics indicative of the object (e.g., infrared radiation), but may decrease for smaller numbers of node devices detecting the presence characteristics indicating the object. For example, if a node device detects infrared radiation potentially indicative of the presence of the object in the room, and six neighboring node devices all detect infrared radiation potentially indicative of the presence of the object in the room, then the processor of one or more of these node devices can determine a large, first probability that the object is located within the room.

But, if only two of these node devices detect the infrared radiation, the processor of one or more of these node devices can determine a smaller, second probability the object is located within the room. The probability or likelihood that the object is within the structure can be compared to one or more thresholds to decide or make a determination that the object is, in fact, in the room. One or more responsive actions based on the presence of the object can then be implemented.

In one embodiment, the areas of a structure that are monitored by different node devices spatially overlap each other. For example, two or more neighboring node devices may have monitored areas that partially, but not entirely, overlap each other. This can result in at least part of the structure being concurrently monitored by two or more node devices. While the term "area" is used to describe the space monitored by the occupancy sensor of a node device, the monitored area can be a three-dimensional volume of space that is monitored, a two-dimensional area on a surface (e.g., a floor), or the like.

While infrared radiation is one presence characteristic that can be sensed by the occupancy sensors of the node devices, the occupancy sensors optionally can sense one or more other presence characteristics. For example, the occupancy sensors can sense light to detect the likelihood that an object is in the structure, the occupancy sensors can sense sound to detect the likelihood that an object is in the structure, the occupancy sensors can sense changes in a structured light array to detect the likelihood that an object is in the structure, etc.

The node devices may be standalone sensing assemblies, or may be incorporated into other assemblies within the structure. For example, a node device may be incorporated into a luminaire or other light-generating device. As another example, one or more of the node devices can be incorporated into one or more other components, such as a camera, bookshelf, light switch, outlet, or the like The systems and methods described herein provide distributed motion sensing networks that increase the reliability of occupancy detection of the structure. At least one technical effect of the inventive subject matter described herein includes the ability to more accurately determine the presence of one or more objects within a room. Additionally, the systems and methods described herein can allow for improved distributed lighting control systems that are able to more accurately detect motion and activate or deactivate different lights within the structure based on the detected presence of an object, such as a person. In one embodiment, the node devices may be coupled with each other in a mesh network, thereby avoiding expensive and/or time-consuming commissioning processes before the occupancy detection network is able to be used.

Figure 1:
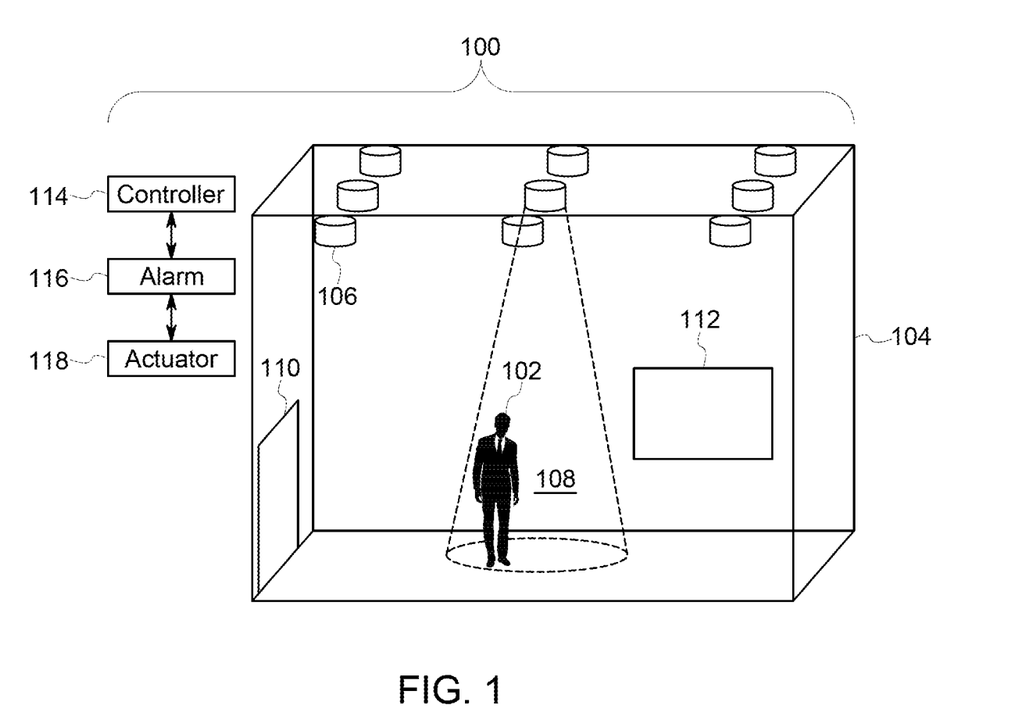
FIG. 1 illustrates one embodiment of a distributed occupancy detection system.

FIG. 1 illustrates one embodiment of a distributed occupancy detection system 100. The detection system 100 operates to detect the presence of one or more objects 102 within a structure 104 based on one or more sensed presence characteristics of the object 102. The object 102 is shown as a human person, but optionally can be another object. The structure 104 can be a room within a larger structure, such as a house, shop, or other building. The structure 104 can include one or more entrances into the interior of the structure 104, such as a door 110 and/or a window 112.

The detection system 100 includes several node devices 106. The node devices 106 can be spatially distributed throughout the structure 104. The node devices 106 can be spaced apart from each other in different locations within the structure 104 such that the monitored areas of the node devices 106 cover a large percentage or fraction of the structure 104.

The node devices 106 include occupancy sensors (not shown in FIG. 1), which optionally can be referred to as motion sensors. The occupancy sensors can sense one or more presence characteristics within the structure 104 that can indicate the presence and/or movement of objects 102 within different monitored areas 108 in the structure 104. A monitored area 108 of a node device 106 can be a volume or area in the structure 104 in which the presence characteristic sensed by the occupancy sensor is monitored. Each node device 106 may monitor for the presence of the object 102 within a different monitored area 108 than the other node devices 106. This can result in no two node devices 106 monitoring the exact same area 108. The monitored areas 108 of two or more node devices 106 may partially, but not entirely, overlap each other.

The occupancy sensors of the node devices 106 monitor for the presence of the object 102 within the different monitored areas 108 and can generate signals responsive to detection of presence characteristics that may indicate the presence of the object 102 within the corresponding monitored areas 108. For example, a node device 106 that detects a small amount of infrared radiation or motion within the monitored area 108 of that node device 106 can generate a probability signal indicative of the small amount of detected infrared radiation or motion. Another node device 106 that detects a larger amount of infrared radiation or motion within the monitored area 108 of that node device 106 can generate a probability signal indicative of the larger amount of infrared radiation or motion that is detected within the area 108.

The probability signals that are generated by the note devices 106 based on detected presence characteristics can include quantitative values representative of the amount of infrared radiation, motion, or other presence characteristic that is detected. For example, a probability signal may be generated to have a large value when a large amount of infrared radiation or motion is detected, and may have a smaller value when a lesser amount of infrared radiation or motion is detected. The values indicated by the probably signals can represent a likelihood or probability that an object 102 is present or moving within the monitored area 108. For example, probability signals having larger values indicate a greater likelihood that the object 102 is located or moving within the corresponding area 108, while probability signals having smaller values indicate a lesser likelihood that the object 102 is located or moving within the corresponding area 108.

The node devices 106 can be communicatively coupled with each other in a network. This network can be a wireless network with the node devices 106 wirelessly communicating with each other. Optionally, the network can be a wired network with the node devices 106 communicating with each other over, through, or via one or more wired connections. In one embodiment, the network formed by the node devices 106 can be a combination of wired connections between two or more node devices 106 and wireless connections between two or more of the node devices 106. The network formed by the node devices 106 can be a mesh network in which each of the node devices 106 can communicate with one or more, or all, other node devices 106 in the network.

The node devices 106 may be aware of the spatial locations of the other node devices 106 in the network, or at least aware of which node devices 106 are neighboring node devices 106. For example, each node device 106 may have a unique network address, and one or more, or all, of the node devices 106 may be programmed with information on which node devices 106 are neighboring node devices 106 based on these network addresses.

In operation, the node devices 106 separately and independently monitor different corresponding areas 108 for the object 102. For example, the monitoring of a first area 108 by a first node device 106 is not dependent on and is not changed by the monitoring of a second area 108 by a second node device 106, and the monitoring of the second area 108 by the second node device 106 is not dependent on and is not changed by the monitoring of the first area 108 by the first node device 106. The monitoring of the different areas 108 by the different node devices 106 are orthogonal to each other.

If at least one node device 106 detects a significantly large magnitude of a presence characteristic (e.g., infrared radiation, motion, light, or the like, that exceeds the upper designated threshold) within the area 108 monitored by that node device 106, then the system 100 determines that the object 102 is present in the structure 104 (and optionally determines that the object 102 is in that area 108). This detection can occur even if only a single node device 106 (and not any other node device 106) detects the motion of the object 102. For example, if the amount of motion indicated by the probability signal generated by only a single node device 106 exceeds an upper designated threshold (for example, a threshold of 95% probability, a threshold of 90% probability, a threshold of 80% probability, or the like), then that node device 106 can determine that the object 102 is present in the structure 104.

But, if a first node device 106 detects a lesser amount of motion (e.g., the sensed motion or infrared radiation does not exceed the upper threshold), then that first single node device 106 alone is not able to determine that the object 102 is present in the structure 104. Instead, that first node device 106 communicates with one or more, or all, neighboring node devices 106 in the network to confirm or refute the potential detection of the object 102. For example, the first node device 106 may send a first probability signal to second through eighth node devices 106 that neighbor the first node device 106. The node devices 106 may neighbor each other when no other node device 106 is between the neighboring node devices 106 and/or when the node devices 106 are within a designated distance of each other, as described herein. Node devices 106 do not neighbor each other when there is at least one other node device 106 between the node devices 106 and/or when the node devices 106 are separated from each other by more than a designated distance, such as farther than three meters, farther than five meters, farther than seven meters, or the like.

The node devices 106 that neighbor each other may exchange probability signals responsive to the detection of at least some motion within one or more of the monitored areas 108. At least one of the node devices 106 that shares the probability signals with its neighboring node devices 106 can determine whether the object 102 is present in the structure 104 based on the probability signals generated by the neighboring node devices 106. For example, if only a single node device 106 detects a lesser amount of motion or infrared radiation (less than the upper designated threshold), then a low likelihood of the object 102 being in the structure 104 may be determined by that node device 106, and the object 102 may not be determined by that node device 106 to be present in structure 104. In one embodiment, a node device 106 does not or cannot change the probability or likelihood that the object 102 is in the structure based on probability signals received from node devices 106 that are not neighboring node devices 106.

But, if one or more neighboring node devices 106 also detect motion or infrared radiation within one or more monitored areas 108 of these neighboring node devices 106, the probability of the object 102 being in the structure 104 increases. As the number of neighboring node devices 106 that detect movement or infrared radiation increases, the probability of the object 102 being in the structure 104 increases. Conversely, as the number of neighboring node devices 106 that detect the movement or infrared radiation decreases, the probability of the object 102 being in the structure 104 decreases.

Responsive to the presence of the object 102 in the structure 104 being detected by one or more the node devices 106, the system 100 optionally may implement one or more responsive actions. For example, the node device or devices 106 that determine the presence of the object 102 in the structure 104 may communicate a detection signal to a controller 114 of the system 100. The controller 114 represents hardware circuitry that includes and/or is connected with one or more processors (for example, one or more microprocessors, one or more field programmable gate arrays, and/or one or more integrated circuits).

The controller 114 can receive this detection signal and then operate to implement one or more responsive actions. As one example, the controller 114 can generate a control signal that is communicated to an output device, such as an alarm 116. This alarm 116 can generate sound and/or lights, or generate another type of output, to notify a user of the system 100 of the presence of the object 102 in the structure 104.

As another example, the controller 114 can communicate a control signal to an actuator 118 that implements the responsive action. The actuator 118 can represent a driver of one or more luminaires in the structure 104. For example, responsive to detecting the presence of the object 102 in the structure 104, the actuator 118 may activate one or more lights in the structure 104. The actuator 118 may only activate the lights associated with or connected with the node device 106 or devices 106 that detected the presence of the object 102, or may activate one or more other lights in the structure 104. This can allow for the detection system 100 to intelligently activate or deactivate lights based on where the object 102 is detected. This can help to only activate lights needed by a person to see areas in the structure 104 around or near the person, and to deactivate lights that are not needed by the person to see areas in the structure 104 around or near the person.

As another example, the actuator 118 may be a motor coupled with a remotely controlled lock that is activated to lock or unlock the door 110 and/or the window 112 responsive to detecting the presence of the object 102 in the structure 104. In another example, the actuator 118 can be a motor that is connected with the door 110 and/or the window 112. The controller 114 may generate a control signal to the actuator 118 to automatically open or close the corresponding door 110 or window 112 responsive to detection of the presence of the object 102 in the structure 104.

Figure 2:
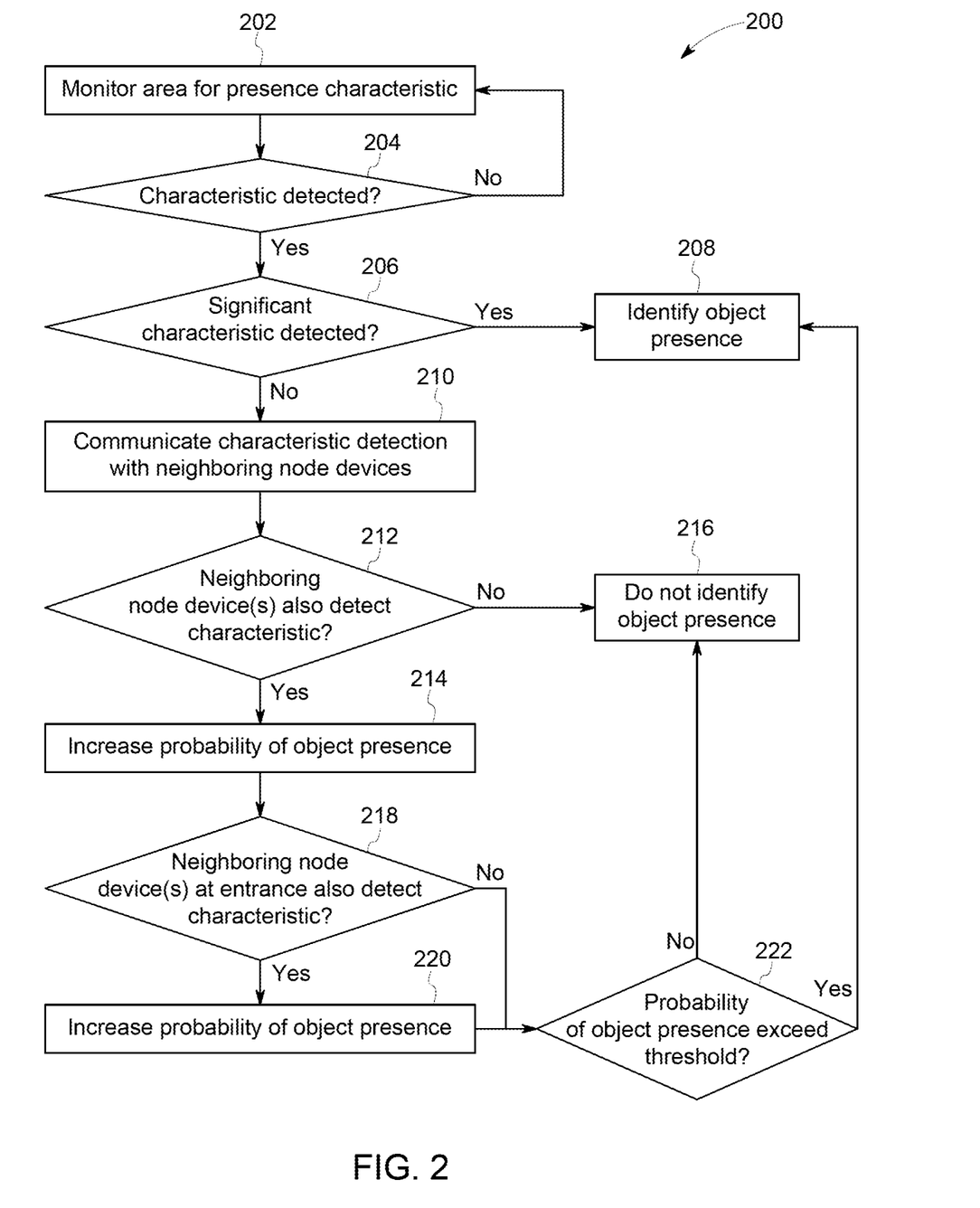
FIG. 2 illustrates a flowchart of one embodiment of a method for detecting a presence of an object in a structure.

FIG. 2 illustrates a flowchart of one embodiment of a method 200 for detecting a presence of an object in the structure. The method 200 can represent the operations performed by each, or one or more, of the node devices 106 of the distributed occupancy detection system 100 shown in FIG. 1. For example, each node device 106 may be able to perform operations Optionally, the method 200 can represent the operations performed by another component of the system 100. For example, instead of the node devices 106 making the final determination of whether or not the object 102 is in the structure 104, the node devices 106 can communicate the probability signals to the controller 114, which makes the decision on whether or not the object 102 is in the structure 104.

Figure 3:
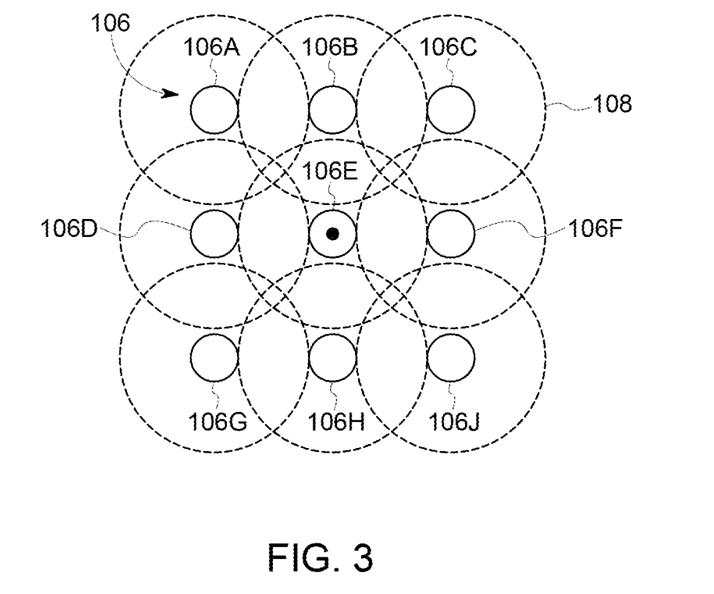
FIG. 3 illustrates a top view of several neighboring node devices of the distributed occupancy detection system shown in FIG. 1.

At 202, an area is monitored for movement. Each node device 106 can monitor a different area 108 in the structure 104 for motion of one or more objects 102 within the areas 108. With continued reference to the method 200 shown in FIG. 2, FIG. 3 illustrates a top view of several neighboring node devices 106 of the distributed occupancy detection system 100 shown in FIG. 1. The node devices 106 shown in FIG. 3 are arranged in a regular grid or array, but alternatively may be disposed in another arrangement. The node devices 106 shown in FIG. 3 are individually labeled as node devices 106A, 106B, 106C, 106D, 106E, 106F, 106G, 106H, and 106J.

Each of the node devices 106 shown in FIG. 3 monitors for movement within a different monitored area 108. The monitored areas 108 represent portions of a floor in a room that are individually and separately monitored for the presence of an object 102 by different node devices 106. As shown, the monitored areas 108 of two or more neighboring node devices 106 may at least partially overlap each other. For example, the monitored area 108 of the node device 106A significantly overlaps with the monitored area 108 of the node device 106B and with the monitored area 108 of the node device 106D. The monitored area 108 of the node device 106A may overlap, but to a lesser amount, with the monitored area 108 of the node device 106E. The monitored area 108 of the node device 106A does not overlap with the monitored areas 108 of other node devices 106, such as the node devices 106C, 106F, 106G, 106H, and 106J.

The node devices 106 shown in FIG. 3 may represent only some, and not all, of the node devices 106 of the system 100 shown in FIG. 1. In the illustrated example, the node device 106B has the most neighboring node devices 106, which includes eight neighboring node devices 106A, 106B, 106C, 106D, 106F, 106G, 106H, and 106J. Another node device 106J may have only three neighboring node devices 106, such as the node device 106E, 106F, and 106H. The node device 106D may have five neighboring node devices, such as the node devices 106A, 106B, 106E, 106G, and 106H. As described above, node devices 106 may neighbor each other when there are no other node devices 106 between the neighboring node devices 106. Optionally, node devices 106 may neighbor each other when the monitored areas 108 of the node devices overlap by at least a designated amount. For example, two node devices 106 may neighbor each other when the monitored areas 108 of the two node devices 106 overlap such that at least 5% of the surface area of each monitored area 108 also is within the monitored area 108 of the other node device 106. Alternatively, two node devices 106 may neighbor each other when the monitored areas 108 of the two node devices 106 overlap such that at least 20% of the surface area of each monitored area 108 also is within the monitored area 108 of the other node device 106. Optionally, two node devices 106 may neighbor each other when the monitored areas 108 of the node devices 106 overlap by any amount. Alternatively, the operator of the system 100 may designate or select which node devices 106 are neighboring node devices 106.

Returning to the description of the method 200 shown in FIG. 2, at 204, a determination is made as to whether or not the node device detected movement within the monitored area of the node device. For example, a node device 106 can determine whether or not at least some infrared radiation, motion, change in light, etc. (albeit a small amount of motion, infrared radiation, or change in light), is detected within the monitored area 108 of that node device 106. If at least some amount of infrared radiation, motion, change in light, or other presence characteristic indicative of the presence of the object 102 in the structure 104 is detected by the node device 106 within the monitored area 108 of that node device 106, then additional considerations may be needed to determine whether or not the object 102 is present within the structure 104. As a result, flow the method 200 can proceed toward 206. Alternatively, if no motion is detected by the node device 106 within the monitored area 108 of that node device 106, then flow of the method 200 can return toward 202. Optionally, flow of the method 200 can terminate.

At 206, a determination is made as to whether the presence characteristic sensed by the node device is a significant amount of the presence characteristic and therefore indicative of the presence of the object. For example, the occupancy sensor of the node device 106 can output a probability signal indicative of a likelihood of whether the presence characteristic of an object 102 (e.g., infrared radiation, motion, change in light, etc.) was detected within the monitored area 108. Larger amounts of infrared radiation, motion, change in light, etc., may result in probability signals indicating a greater likelihood of the object 102 being detected in the monitored area 108, while lesser amounts of infrared radiation, motion, change in light, etc. may result in probability signals indicating a lesser likelihood of the object 102 being detected in the monitored area 108. The probability signal that is output or that is generated by a node device 106 can be based on, indicative of, or proportional to the amount of infrared radiation, motion, change in light, or the like, that is detected by the occupancy sensor.

If a significant amount of the presence characteristic is detected within the monitored area of the node device, then this presence characteristic detected by the single node device may be sufficient to determine that the object is present in the structure. As a result, flow the method 200 can proceed toward 208. This can occur when the probability signal indicates a strong likelihood of the object 102 being within the monitored area 108. For example, if the amount of motion indicated by the probability signal generated by the node device 106 exceeds the upper threshold, then flow of the method 200 can proceed toward 208. As another example, if the amount of infrared radiation detected by the occupancy sensor of the node device 106 exceeds an upper threshold, then flow the method 200 can proceed toward 208.

At 208, the presence of the object in the structure is identified. The presence of the object 102 in the structure 104 can be confirmed based on the large amount of movement, infrared radiation, change in light, etc., that was detected by a single node device 106. While several of the node devices 106 may separately and independently detect significant amounts of the presence characteristic of the same object 102 in the same structure 104, the significant amount of the presence characteristic that is detected by any one of these node devices 106 alone may be enough to confirm the presence of the object 102 in the structure 104.

Optionally, the operation or operations at 208 can include implementing one or more actions in response to detecting the presence of the object. For example, responsive to determining the presence of the object 102 in the structure 104, one or more lights may be activated or deactivated, one or more doors 110 and/or windows 112 may be opened or closed, one or more doors 110 or windows 112 may be locked or unlocked, one or more alarms 116 may be activated, or the like.

Returning to the decision made at 206 in the method 200, if the amount of the sensed presence characteristic is not significant (e.g., does not exceed the designated threshold), then this amount of presence characteristic alone may not be sufficient to determine that the object is in the structure. For example, if the occupancy sensor of the node device 106 detects a small amount of movement or detects a small amount of infrared radiation within the monitored area 108 of the node device 106, then the likelihood that the object 102 is present in the monitored area 108 of that node device 106 is low. The processor of the node device 106 can compare the likelihood of object presence indicated by the probability signal to the upper threshold and, when the likelihood does not exceed the upper threshold, the processor of the node device 106 cannot determine that the object 102 is within the monitored area 108 of that node device 106. Consequently, flow the method 200 can proceed toward 210.

At 210, detection of the presence characteristic by the node device is communicated with one or more neighboring node devices. The node device 106 that detected at least some movement, infrared radiation, etc., within the monitored area 108 of that node device 106 can generate and communicate the probability signal indicative of that movement, infrared radiation, etc., to the neighboring node devices 106. With respect to the example shown in FIG. 3, the node device 106E can detect some movement or infrared radiation within the monitored area 108 associated with the node device 106E. If the detected presence characteristic is not significant enough on its own to determine that the object 102 is present within the monitored area 108 of the node device 106E, then the node device 106E can communicate a probability signal to the neighboring node devices 106A, 106B, 106C, 106D, 106E, 106F, 106G, 106H, and/or 106J.

This communication of a probability signal also can occur for the neighboring node devices. For example, one or more of the neighboring node devices 106A, 106B, 106C, 106D, 106F, 106G, 106H, and/or 106J can communicate a probability signal to the node device 106E. Because different node devices 106 may detect different amounts of motion or infrared radiation (or no motion or infrared radiation at all), the probability signals generated and sent by different node devices 106 may differ from each other.

Returning to the description of the method 200 shown in FIG. 2, at 212, a determination is made as to whether one or more neighboring node devices also detected a presence characteristic indicative of the presence of the object in the structure. For example, a first node device 106 that detects at least some movement within the monitored area of the first node device 106 can communicate the probability signal indicative of this detected movement to one or more neighboring node devices 106 of the first node device 106. Similarly, one or more of these neighboring node devices 106 can communicate one or more probability signals indicative of movement detected in the monitored areas 108 of one or more of these other neighboring node devices 106. The first node device 106 can determine whether movement also was detected in one or more of the monitored areas 108 of one or more neighboring node devices 106 based on these probability signals. Optionally, the first node device 106 can determine that motion was not detected in one or more monitored areas 108 of one or more neighboring node devices 106 based on the absence of a probability signal from one or more the neighboring node devices 106. For example, if movement was not detected by a neighboring node device 106, the net neighboring node device 106 may not communicate a probability signal to the first node device 106.

In one embodiment, different node devices 106 may sense different presence characteristics to determine the presence or absence of the object 102 in the corresponding monitored area 108. For example, a first node device 106 may sense some infrared radiation in the monitored area 108 of the first node device 106, while a second node device 106 that neighbors the first node device 106 may sense movement in the monitored area 108 of the second node device 106. The different node devices 106 can sense different characteristics indicative of the presence or absence of the object 102, but can share the probability signals indicating the likelihood that the different characteristics indicate the presence of the object 102. These likelihoods can be used to conclude that the object 102 is or is not in the structure 104, regardless of which node device 106 sensed which presence characteristic in at least one embodiment. Alternatively, the neighboring node devices 106 sense the same presence characteristic to conclude that the object 102 is or is not in the structure 104.

In the example shown in FIG. 3, the node device 106E that detected motion within the monitored area 106 of the node device 106E, can determine whether a probability signal was received at the node device 106E by one or more of the neighboring node devices 106A, 106B, 106C, 106D, 106F, 106G, 106H, and/or 106J.

Returning to the description of the method 200 shown in FIG. 2, if, at 212, the probability signal or signal sent by one or more other neighboring node devices also indicates that the presence characteristic was detected, then there is a greater likelihood that the object is in the structure (relative to only a single node device detecting the presence characteristic). As a result, flow of the method 200 can proceed toward 214.

But, if no other neighboring node device communicates a probability signal indicating that the presence characteristic was detected, the absence of additional node devices detecting the presence characteristic indicates that there is a lesser likelihood that the characteristic detected by one node device indicates to the object is in the structure. As a result, flow the method 200 can proceed toward 216. At 216, the presence of the object within the structure is not identified. For example, because only a single node device 106 detected motion or infrared radiation, and the amount of motion or infrared radiation that was detected was not significant, the node device 106 that detected motion or infrared radiation may determine that the likelihood that the object 102 is in the structure 104 is too low to confirm the presence of the object 102 in the structure 104. Consequently, the node device 106 and/or the system 100 can determine that the object 102 is not in the structure 104, or can determine that the movement or infrared radiation that was detected does not indicate the presence of the object 102 in the structure 104.

At 214, a probability that the object is present in the structure is increased. For example, the node device 106 that detected the presence characteristic within the monitored area 108 of that node device 106 can increase a numerical value of a probability that the object 102 is located within the structure 104 due to one or more neighboring node devices 106 also detecting some presence characteristic indicating the presence of the object 102. This probability may increase for each neighboring node device 106 that also detected the presence characteristic.

With respect example shown in FIG. 3, if the node device 106E that detected motion within the monitored area 108 of the node device 106E and the neighboring node devices 106A, 106D also detected motion (or another presence characteristic), then the probability that the object 102 is within the structure 104 may be increased. If the neighboring node device 106B also detected motion (or another presence characteristic), the probability that the object 102 is within the structure 104 may be increased by an even greater amount.

Conversely, if only the node device 106E and the neighboring node device 106A detected a presence characteristic, the probability that the object 102 is within the structure 104 may be increased, but by a lesser amount than one multiple neighboring node devices 106 detected motion.

The probability that the object 102 is within the structure 104 may be increased for each additional neighboring node device 106 that also detected the presence characteristic. For example, the node device 106E may determine a first probability of the presence of the object 102 based on the magnitude of movement or infrared radiation sensed by the node device 106E. This first probability may be increased by a fixed amount for each additional neighboring node device 106 that also detected movement or infrared radiation at the same time as the node device 106E or within a designated time period of when the node device 106E detected the movement or infrared radiation. This designated time period can be, for example, one second, one half second, two hundred fifty milliseconds, or another limit.

The amount that the probability is increased for each additional neighboring node device 106 that detected the presence characteristic can be, for example, a 5% increase in likelihood, a 10% increase in the likelihood, a 15% increase in likelihood, or another increase.

Figure 4:
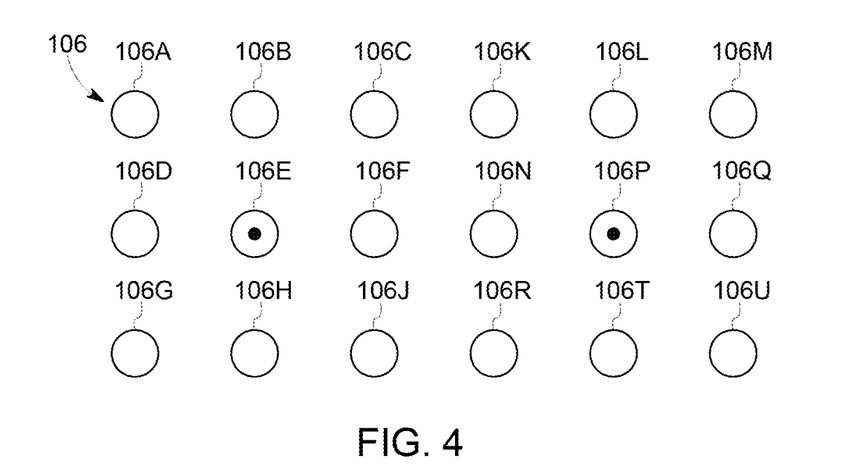
FIG. 4 illustrates another top view of the node devices in the distributed occupancy detection system shown in FIG. 1.

FIG. 4 illustrates another top view of the node devices 106 in the distributed occupancy detection system 100 shown in FIG. 1. FIG. 4 illustrates a larger number of the node devices 106 than is shown in FIG. 3, such as the additional node devices 106K, 106L, 106M, 106N, 106P, 106Q, 106R, 106T, and 106U. In this example, motion may only be detected by the node device 106E and by the node device 106P in the different, respective monitored areas 108 of the node devices 106E, 106P. The monitored areas 108 of these node devices 106 are not shown in FIG. 4, but may be similar or identical in size to the monitored areas 108 shown in FIG. 3.

As described above, responsive to detecting the presence characteristic within the monitored areas 108, each of the node device 106B and the node device 106P may generate and send a probability signal to the neighboring node devices 106 of each of the node devices 106E, 106P. With respect to the node device 106E, the node device 106E can send a probability signal representative of the detected presence characteristic to the node devices 106A, 106B, 106C, 106D, 106F, 106G, 106H, and/or 106J. Similarly, the node device 106P can generate and send a probability signal indicative of the presence characteristic detected by the node device 106P to each of the neighboring node devices 106K, 106L, 106M, 106N, 106Q, 106R, 106T, and 106U. The probability signal sent by the node device 106E may or may not be communicated with node devices 106 that do not neighbor the node device 106E. For example, the node device 106E may only send the probability signal to the neighboring node devices 106 of the node device 106E, and not any other node device 106. Similarly, the probability signal sent by the node device 106P may or may not be communicated to one or more node devices 106 that do not neighbor the node device 106P. Alternatively, the node devices 106 can send the probability signals to one or more non-neighboring node devices 106.

In the illustrated embodiment, because no neighboring node device 106 of the node device 106E detected a presence characteristic, and because no neighboring node device of the node device 106P detected a presence characteristic, the probability that the object 102 is in the structure 104 that is calculated by each of the node devices 106E, 106P may be relatively small. This probability may be small because no neighboring node device 106 of either of the node device 106E or the node device 106P also detected the presence characteristic.

Returning to the description of the method 200 shown in FIG. 2 at 216, a determination is made as to whether or not a neighboring node device located at or near an entrance to the structure also detected a presence characteristic. For example, if a node device 106 that is not at or near an entrance to the structure 104 and a neighboring node device 106 located at or near the entrance also detected the presence characteristic, the likelihood that the detected presence characteristics indicates the object 102 is in the structure 104 may be increased. This can be due to the node device 106 at or near the entrance detecting entry of the object 102 into the structure 104 and the other node device 106 (that is not at or near the entrance) also detecting the object 102 in the structure 104.

Figure 5:
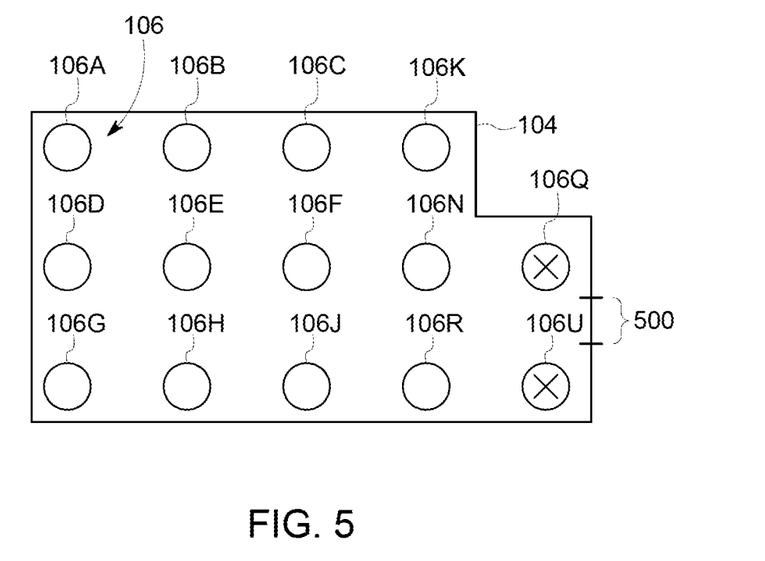
FIG. 5 illustrates another arrangement of the node devices of the distributed occupancy detection system shown in FIG. 1.

FIG. 5 illustrates another arrangement of the node devices 106 of the distributed occupancy detection system 100 shown in FIG. 1. In the illustrated example, the structure 104 includes an entrance 500, which can represent the door 110 or the window 112 shown in FIG. 1. The node devices 106q, 106U are the node devices 106 that are closest to the entrance 500 relative to the other node devices 106 within the structure 104. Optionally, a node device 106 may be at or near the entrance 500 when the node device 106 is within a designated distance of the entrance 500, such as within three meters of the entrance 500, within five meters of the entrance 500, or another spatial limit.

The locations of different node devices 106 in the structure 104 may be known to the node devices 106, such as by being programmed into the internal memories of the processors of the node devices 106 by an operator or technician that installed the system 100 in the structure 104. The location of the node devices 106Q, 106U being at or near the entrance 500 also can be noted or otherwise stored in the memories of the node devices 106.

Returning to the description of the method 200 shown in FIG. 2, at 218, the probability signals received from one or more neighboring node devices can be examined to determine if the probability signal is sent from a node device that is at or near an entrance to the structure. In the example shown in FIG. 5, if the node device 106N detects a presence characteristic and receives a probability signal from the neighboring node device 106Q and/or the neighboring node device 106U (also indicating that a presence characteristic was sensed near the entrance 500 to the structure 104), then the processor of the node device 106N can determine whether the neighboring node device 106Q and/or 106U is located at or near the entrance 500 to the structure 104.

If the probability signal is received from a neighboring node device 106 located at or near an entrance 500 to the structure 104, this can indicate a greater likelihood that the detected motion indicates the presence of the object 102 in the structure 104. For example, if both the node device 106N and the neighboring node device 106Q (that is located at or near the entrance 500) detect movement in the respective monitored areas 108, then there is an increased likelihood the object 102 is within the structure 104. This can be because the object 102 likely entered into the structure 104 through the entrance 500, with the movement or infrared radiation of the object 102 being detected by the node device 106Q as the object 102 entered the structure 104. Therefore, if a neighboring node device 106 detects movement and this neighboring node device 106 is located at or near an entrance 500 to the structure 104, the likelihood that the detected motion indicates the presence of the object 102 in the structure 104 is increased. As a result, flow the method 200 can proceed toward 220. But, if the neighboring node device that also detected the presence characteristic is not at or near the entrance 500 to the structure 104, this probability may not need to be increased further. As a result, flow the method 200 can proceed toward 222.

At 220, the probability that the detected characteristics indicate the presence of the object in the structure is increased further. As described above, the probability of whether the object 102 is in the structure 104 can be determined based on the magnitude of the presence characteristic is detected by a first node device 106, based on how many (if any) of the node devices 106 that neighbor the first node device 106 also detect a presence characteristic, and/or based on whether any of the neighboring node devices 106 that also detected movement are located at or near an entrance 500 to the structure 104.

At 222, a determination is made as to whether the probability of the presence of the object in the structure exceeds a threshold. This threshold may be a lower designated threshold that is less then or smaller than the threshold used in connection with the determination made at 206. For example, while the upper threshold used in connection with the decision made at 206 may require a 90% likelihood of object presence, the lower probability threshold used in connection with decision made at 222 may be 70% (or another value). The node device 106 that detected a presence characteristic, that examined probability signals sent by one or more neighboring node devices 106, and/or that determined whether or not one or more neighboring node devices 106 that also detected a presence characteristic is located at or near an entrance to the structure, may determine that the object 102 is in the structure 104 responsive to the combined probability exceeding this lower threshold. As a result, flow of the method 200 can proceed toward 208. As described above, the presence of the object 102 in the structure 104 is determined at 208 and optionally one or more responsive actions may be implemented. But, if the probability of the object presence does not exceed the threshold at 222, then flow of the method 200 can proceed toward 216. As described above, the presence of the object 102 is not identified in the structure 104 at 216. Flow the method 200 can return from 216 and/or 208 to 202. Optionally, the method 200 may terminate.

Figure 6:
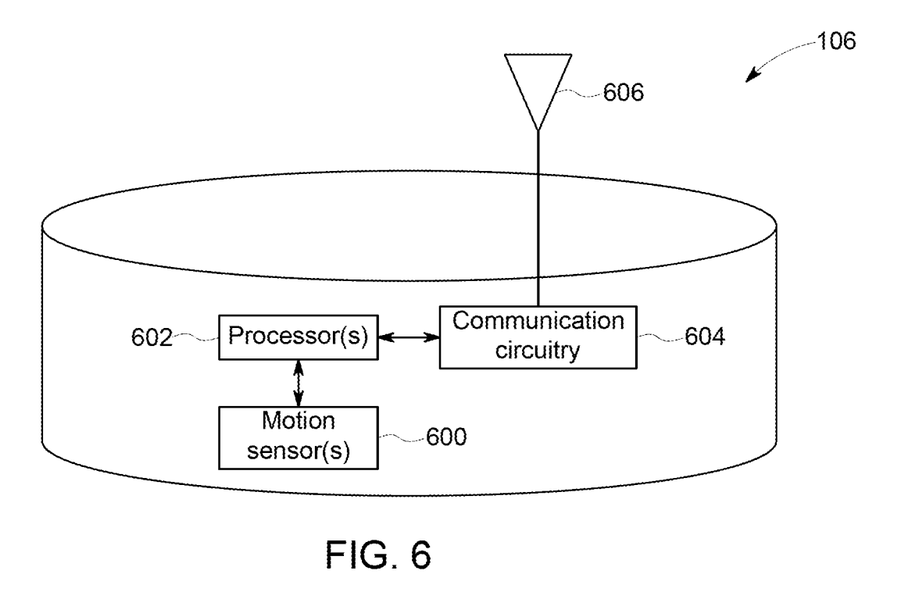
FIG. 6 illustrates one example of a node device shown in FIG. 1.

FIG. 6 illustrates one example of a node device 106 shown in FIG. 1. The node device 106 includes one or more occupancy sensors 600. The occupancy sensor 600 can include a passive infrared occupancy sensor or another type of occupancy sensor. For example, the occupancy sensor 600 can include a LiDAR sensor, a radar sensor, a photodetector, another type of light sensor, a camera, or the like. The occupancy sensor 600 can generate data indicative of the presence characteristics described above, such as a detection of infrared radiation, a change in an image or video indicating the presence of the object 102, a change in light, or the like.

The node device 106 also includes one or more processors 602 that are connected with and/or included in hardware circuitry of the node device 106. The processor 602 can represent one or more microprocessors, one or more field programmable gate arrays, one or more integrated circuits, or a combination thereof. The processor 602 performs the operations, comparisons, and the like, described herein for the node device 106 to perform the operations described herein.

The node device 106 also includes communication circuitry 604. The communication circuitry 604 represents components used to communicate with other node devices 106 and optionally with the controller 114 shown in FIG. 1 as described herein. The communication circuitry 604 can include one or more modems, transceivers circuitry, antennas 606, and the like to allow the node device 106 to communicate with other node devices 106 and/or the controller 114 over, through, using, or via one or more wired and/or wired communication paths or connections.

In one embodiment, a first node device of a distributed occupancy detection system is provided. The node device includes an occupancy sensor configured to sense a presence characteristic indicative of an object being in a monitored area of a structure that is associated with the occupancy sensor. The node device also includes one or more processors configured to determine a probability that the object is or was located in the monitored area of the structure based on the presence characteristic sensed by the occupancy sensor. The one or more processors also are configured to receive one or more detection signals from one or more second node devices in the distributed occupancy detection system. The one or more detection signals indicate that the one or more second node devices also sensed the presence characteristic indicating that the object was or is located in one or more monitored areas of the structure that are associated with the one or more second node devices. The one or more processors are configured to change the probability that the object is or was located in the monitored area of the structure based on the one or more detection signals received from the one or more second node devices. The one or more processors also are configured to determine whether the object is in the structure based on the probability that is changed based on the one or more detection signals.

Optionally, the occupancy sensor is configured to sense one or more of movement, infrared radiation, or a change in light as the presence characteristic.

Optionally, the one or more processors are configured to calculate the probability based on a magnitude of the presence characteristic that is sensed by the occupancy sensor.

Optionally, the monitored area of the occupancy sensor differs from the one or more monitored areas of the one or more second node devices.

Optionally, the monitored area of the occupancy sensor partially overlaps the one or more monitored areas of the one or more second node devices.

Optionally, the one or more processors are configured to change the probability based on the one or more detection signals that are received from the one or more second node devices that neighbor the first node device in the structure.

Optionally, the one or more processors are configured to change the probability by increasing the probability based on the one or more detection signals received from the one or more second node devices.

Optionally, the one or more processors are configured to change the probability by increasing the probability based on at least one of the second node devices that sent at least one of the detection signals being located at an entrance to the structure.

In one embodiment, a method is provided that includes sensing a presence characteristic using an occupancy sensor of a first node device in a distributed occupancy detection system. The presence characteristic is indicative of an object being in a monitored area of a structure that is associated with the occupancy sensor. The method also includes calculating a probability that the object is or was located in the monitored area of the structure based on the presence characteristic sensed by the occupancy sensor, and receiving one or more detection signals from one or more second node devices in the distributed occupancy detection system. The one or more detection signals indicate that the one or more second node devices also sensed the presence characteristic indicating that the object was or is located in one or more monitored areas of the structure that are associated with the one or more second node devices. The method also includes changing the probability that the object is or was located in the monitored area of the structure based on the one or more detection signals received from the one or more second node devices, and determining whether the object is in the structure based on the probability that is changed based on the one or more detection signals.

Optionally, the presence characteristic represents one or more of movement, infrared radiation, or a change in light.

Optionally, the probability is calculated based on a magnitude of the presence characteristic that is sensed by the occupancy sensor.

Optionally, the monitored area of the occupancy sensor differs from the one or more monitored areas of the one or more second node devices.

Optionally, the monitored area of the occupancy sensor partially overlaps the one or more monitored areas of the one or more second node devices.

Optionally, the probability is changed based on the one or more detection signals that are received from the one or more second node devices that neighbor the first node device in the structure.

Optionally, the probability is changed by increasing the probability based on the one or more detection signals received from the one or more second node devices.

Optionally, the probability is changed by increasing the probability based on at least one of the second node devices that sent at least one of the detection signals being located at an entrance to the structure.

In one embodiment, a distributed occupancy detection system is provided that includes plural node devices configured to be spatially distributed throughout a structure and communicatively coupled with each other in a network. Each of the node devices includes an occupancy sensor that is configured to sense a presence characteristic indicative of an object being in a monitored area of the structure that is associated with the occupancy sensor. Each of the node devices also includes one or more processors configured to determine a probability that the object is or was located in the structure based on the presence characteristic sensed by the occupancy sensor of a first node device of the plural node devices and based on the presence characteristic sensed by the occupancy sensor of one or more neighboring node devices of the plural node devices that neighbor the first node device in the structure. The one or more processors are configured to determine whether the object is in the structure based on the probability.

Optionally, the occupancy sensors are configured to sense one or more of movement, infrared radiation, or a change in light as the presence characteristic.

Optionally, the monitored areas of the occupancy sensors in the plural node devices that neighbor each other partially overlap each other.

Optionally, the one or more processors are configured to increase the probability based on at least one of the node devices that having the occupancy sensor that sensed the presence characteristic being located at an entrance to the structure.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A first node device of a distributed occupancy detection system, the node device comprising:
    an occupancy sensor configured to sense a presence characteristic indicative of an object being in a monitored area of a structure that is associated with the occupancy sensor; and
    one or more processors configured to determine a probability that the object is or was located in the monitored area of the structure based on the presence characteristic sensed by the occupancy sensor,
    wherein the one or more processors also are configured to receive one or more detection signals from one or more second node devices in the distributed occupancy detection system, the one or more detection signals indicating that the one or more second node devices also sensed the presence characteristic indicating that the object was or is located in one or more monitored areas of the structure that are associated with the one or more second node devices,
    wherein the one or more processors are configured to change the probability that the object is or was located in the monitored area of the structure based on the one or more detection signals received from the one or more second node devices, and
    wherein the one or more processors are configured to determine whether the object is in the structure based on the probability that is changed based on the one or more detection signals wherein the one or more processors are configured to change the probability by increasing the probability based on at least one of the second node devices that sent at least one of the detection signals being located at an entrance to the structure.

2. The first node device of claim 1, wherein the occupancy sensor is configured to sense one or more of movement, infrared radiation, or a change in light as the presence characteristic.

3. The first node device of claim 1, wherein the one or more processors are configured to calculate the probability based on a magnitude of the presence characteristic that is sensed by the occupancy sensor.

4. The first node device of claim 1, wherein the monitored area of the occupancy sensor differs from the one or more monitored areas of the one or more second node devices.

5. The first node device of claim 1, wherein the monitored area of the occupancy sensor partially overlaps the one or more monitored areas of the one or more second node devices.

6. The first node device of claim 1, wherein the one or more processors are configured to change the probability based on the one or more detection signals that are received from the one or more second node devices that neighbor the first node device in the structure.

7. The first node device of claim 1, wherein the one or more processors are configured to change the probability by increasing the probability based on the one or more detection signals received from the one or more second node devices.

8. A method comprising:
sensing a presence characteristic using an occupancy sensor of a first node device in a distributed occupancy detection system, the presence characteristic indicative of an object being in a monitored area of a structure that is associated with the occupancy sensor;
calculating a probability that the object is or was located in the monitored area of the structure based on the presence characteristic sensed by the occupancy sensor;
receiving one or more detection signals from one or more second node devices in the distributed occupancy detection system, the one or more detection signals indicating that the one or more second node devices also sensed the presence characteristic indicating that the object was or is located in one or more monitored areas of the structure that are associated with the one or more second node devices;
changing the probability that the object is or was located in the monitored area of the structure based on the one or more detection signals received from the one or more second node devices; and
determining whether the object is in the structure based on the probability that is changed based on the one or more detection signals;
wherein the probability is changed by increasing the probability based on at least one of the second node devices that sent at least one of the detection signals being located at an entrance to the structure.

9. The method of claim 8, wherein the presence characteristic represents one or more of movement, infrared radiation, or a change in light.

10. The method of claim 8, wherein the probability is calculated based on a magnitude of the presence characteristic that is sensed by the occupancy sensor.

11. The method of claim 8, wherein the monitored area of the occupancy sensor differs from the one or more monitored areas of the one or more second node devices.

12. The method of claim 8, wherein the monitored area of the occupancy sensor partially overlaps the one or more monitored areas of the one or more second node devices.

13. The method of claim 8, wherein the probability is changed based on the one or more detection signals that are received from the one or more second node devices that neighbor the first node device in the structure.

14. The method of claim 8, wherein the probability is changed by increasing the probability based on the one or more detection signals received from the one or more second node devices.

15. A distributed occupancy detection system comprising:
plural node devices configured to be spatially distributed throughout a structure and communicatively coupled with each other in a network, each of the node devices including an occupancy sensor that is configured to sense a presence characteristic indicative of an object being in a monitored area of the structure that is associated with the occupancy sensor,
wherein each of the node devices also includes one or more processors configured to determine a probability that the object is or was located in the structure based on the presence characteristic sensed by the occupancy sensor of a first node device of the plural node devices and based on the presence characteristic sensed by the occupancy sensor of one or more neighboring node devices of the plural node devices that neighbor the first node device in the structure,
wherein the one or more processors are configured to determine whether the object is in the structure based on the probability; and
wherein the one or more processors are configured to increase the probability based on at least one of the node devices that having the occupancy sensor that sensed the presence characteristic being located at an entrance to the structure.

16. The distributed occupancy detection system of claim 15, wherein the occupancy sensors are configured to sense one or more of movement, infrared radiation, or a change in light as the presence characteristic.

17. The distributed occupancy detection system of claim 15, wherein the monitored areas of the occupancy sensors in the plural node devices that neighbor each other partially overlap each other.

* * * * *